US011500989B2

(12) United States Patent
Kulkarni et al.

(10) Patent No.: US 11,500,989 B2
(45) Date of Patent: Nov. 15, 2022

(54) METHOD OF MANAGING PRIORITY IN THE CONTEXT OF A SECURE ELEMENT DOMAIN WITH MULTIPLE INTERFACES, ELECTRONIC DEVICE AND COMMUNICATION SYSTEM

(71) Applicant: NXP B.V., Eindhoven (NL)

(72) Inventors: Giten Kulkarni, Bangalore (IN);
Shameer Puthalan, Bangalore (IN);
Xavier Jérôme Kerdreux,
Bieville-Beuville (FR)

(73) Assignee: NXP B.V., Eindhoven (NL)

( * ) Notice: Subject to any disclaimer, the term of this patent is extended or adjusted under 35 U.S.C. 154(b) by 344 days.

(21) Appl. No.: 16/784,396

(22) Filed: Feb. 7, 2020

(65) Prior Publication Data
US 2020/0265140 A1 Aug. 20, 2020

(30) Foreign Application Priority Data

Feb. 15, 2019 (EP) ..................................... 19290012

(51) Int. Cl.
*G06F 21/57* (2013.01)
*G06K 7/10* (2006.01)
(Continued)

(52) U.S. Cl.
CPC ......... *G06F 21/57* (2013.01); *G06K 7/10297* (2013.01); *H04W 12/30* (2021.01); *H04W 12/47* (2021.01)

(58) Field of Classification Search
CPC ..................................................... G06F 21/57
See application file for complete search history.

(56) References Cited

U.S. PATENT DOCUMENTS 8,079,530 B2 12/2011 Adams et al.
8,285,329 B1 10/2012 Zhu
(Continued)

FOREIGN PATENT DOCUMENTS

CN 102426658 A 4/2012
EP 2251986 A1 11/2010
(Continued)

OTHER PUBLICATIONS

Global Platform Technology, Contactless Services, Card Specification v2.3—Amendment C; Version 1.2.1; Public Release Jul. 2018.
(Continued)

*Primary Examiner* — Bradley W Holder

(57) ABSTRACT

A method of managing priority in an electronic device, wherein the electronic device comprises a contact-less communication domain and a secure element domain, wherein the contact-less communication domain and the secure element domain are connected via a domain interface, and wherein the secure element domain comprises two or more interfaces. The method comprises: i) detecting (by the contact-less communication domain), a radio frequency (RF) field of an external device and, upon detecting said RF field or upon receiving a first command from the external device, ii) sending a priority request via the domain interface to the secure element domain; iii) receiving (by the secure element domain) the priority request and identifying whether the secure element domain is in a processing status, hereby iv) upon identifying that the secure element domain is not in a processing status, approving (by the secure element domain) the requested priority, and starting a transaction (by the contact-less communication domain) in a priority status; and v) upon identifying that the secure element domain is in a processing status, denying (by the secure element domain) the requested priority, and (Continued)

starting a mute status or remaining in a mute status (by the contact-less communication domain), such that the external device cannot detect the contact-less communication domain.

14 Claims, 14 Drawing Sheets

(51) Int. Cl.
*H04W 12/30* (2021.01)
*H04W 12/47* (2021.01)

(56) References Cited

U.S. PATENT DOCUMENTS

| | | | |
|---|---|---|---|
| 9,594,917 | B2 | 3/2017 | Buer et al. |
| 2008/0162361 | A1 | 7/2008 | Sklovsky et al. |
| 2012/0032789 | A1* | 2/2012 | Ichimaru ............ G06Q 20/3278 340/10.5 |
| 2012/0178366 | A1* | 7/2012 | Levy .................... H04W 74/06 455/41.1 |
| 2013/0060934 | A1* | 3/2013 | Mendel ............... H04L 43/0817 709/224 |
| 2016/0360352 | A1* | 12/2016 | Khan ...................... H04W 4/80 |

FOREIGN PATENT DOCUMENTS

| | | |
|---|---|---|
| EP | 3422197 A1 | 1/2019 |
| ES | 2308377 T3 | 12/2008 |

OTHER PUBLICATIONS

NXP System Architecture Delta, Architecture Design; SN100T/U, Doc Rev 1.0 Dated May 30, 2018.

* cited by examiner

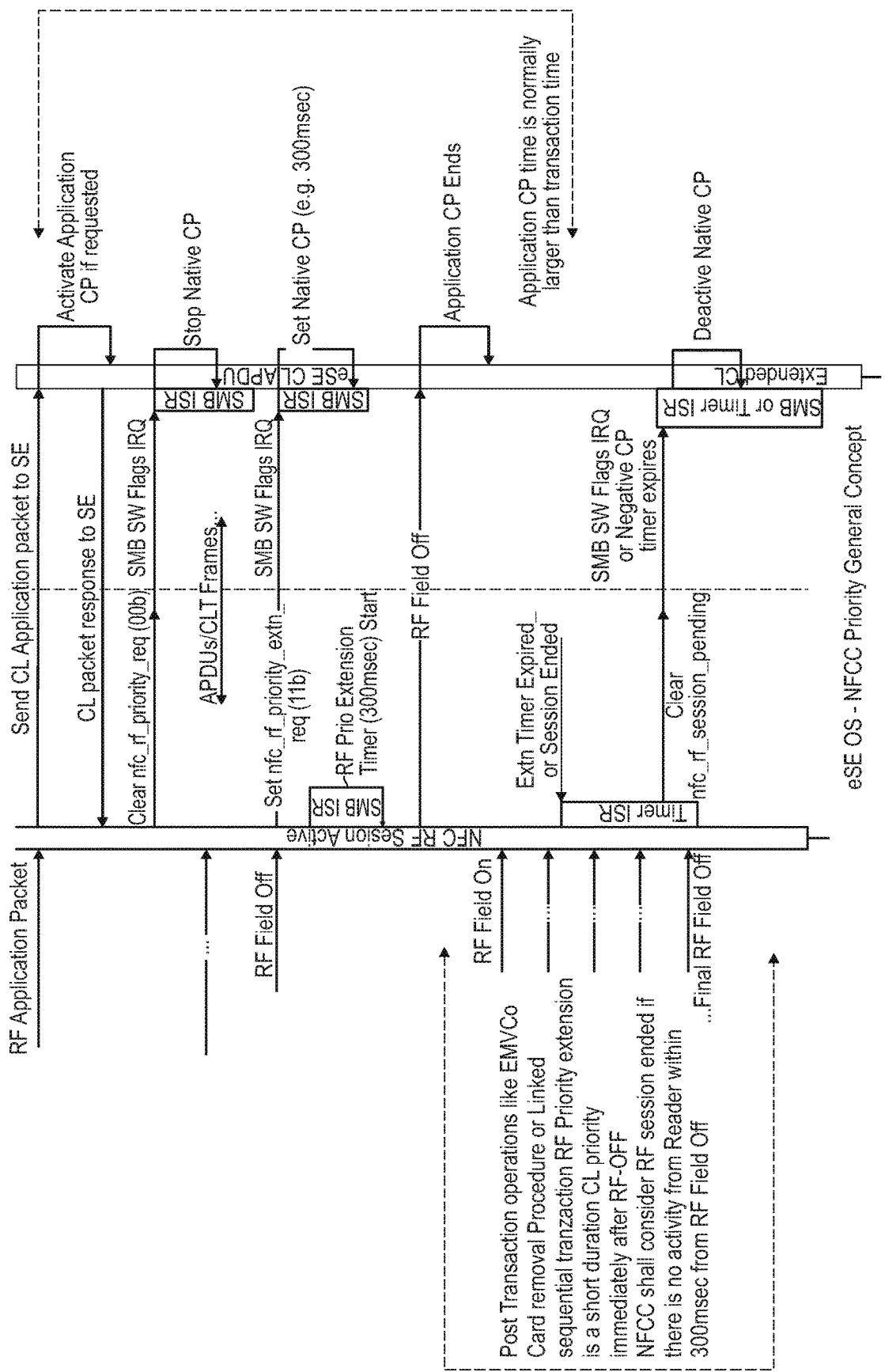

METHOD OF MANAGING PRIORITY IN THE CONTEXT OF A SECURE ELEMENT DOMAIN WITH MULTIPLE INTERFACES, ELECTRONIC DEVICE AND COMMUNICATION SYSTEM

CROSS-REFERENCE TO RELATED APPLICATIONS

This application claims priority under 35 U.S.C. § 119 to European Patent Application No. 19290012.4, filed on Feb. 15, 2019, the contents of which are incorporated by reference herein.

FIELD OF THE INVENTION

The invention relates to a method of managing an electronic device comprising a contact-less communication domain and a secure element domain, wherein the domains are connected via a domain interface, and wherein the secure element domain comprises two or more interfaces. The invention further relates to the electronic device, a mobile device comprising the electronic device, and a communication system comprising the electronic device or the mobile device, and an external device.

BACKGROUND OF THE INVENTION

Mobile devices such as smart cards or mobile phones are frequently used in order to perform transactions. As these transactions may include sensitive data, e.g. in case of financial transactions, a secure element may be used, wherein sensitive data, such as user credentials, are securely stored. During a transaction, an external reader device (e.g. a terminal of a point of sale) requests access to an interface of the secure element such that a secure and authenticated transaction can be performed. However, in the case that the secure element comprises two or more interfaces, the situation may become more complex.

For example, the chip SN100U from NXP comprises an embedded secure element and an NFC controller integrated on one and the same chip. The secure element comprises multiple interfaces and corresponding use cases of these interfaces may occur in parallel (concurrent). Conventionally, the operating system of a secure element (domain) has a scheduling algorithm, in particular single-threaded, and requests arriving to the secure element domain in parallel are served on a first-come-first-served basis. In other words, in such systems, the secure element operating system serializes the various incoming requests on various interfaces and handles one command at a time. Such serialization results in delayed processing of one interface, while another interface command is ongoing. This adversely affects timing critical operations such as contact-less payment and transit applications. Especially if such delays occur during initial activation or authentication, the reader may report a transaction failure.

OBJECT AND SUMMARY OF THE INVENTION

There may be a need to manage priority regarding multiple interfaces, in particular multiple interfaces of a secure element domain, in an efficient, secure and robust manner.

In order to achieve the object defined above, a method, an electronic device, a mobile device, and a communication system according to the independent claims are provided.

According to an exemplary embodiment, a method of managing priority in an electronic device is provided. The electronic device comprises a contact-less communication domain and a secure element domain, wherein the contact-less communication domain and the secure element domain are connected via a domain interface, and wherein the secure element domain comprises two or more interfaces. The method comprises: i) detecting (by the contact-less communication domain) a radio frequency (RF) field of an external device and, upon detecting said RF field or upon receiving a first command from the external device, ii) sending a priority request via the domain interface to the secure element domain; iii) receiving (by the secure element domain) the priority request and identifying whether the secure element domain is in a processing status (or not), hereby iv) upon identifying that the secure element domain is not in a processing status, approving (by the secure element domain) the requested priority, and starting a transaction (by the contact-less communication domain) in a priority status; and v) upon identifying that the secure element domain is in a processing status, denying (by the secure element domain) the requested priority, and starting a mute status or remaining in a mute status (by the contact-less communication domain), such that the external device cannot detect the contact-less communication domain.

According to another exemplary embodiment, an electronic device is provided, wherein the electronic device comprises: 1) a contact-less communication domain, and 2) a secure element domain which comprises two or more interfaces, wherein the contact-less communication domain and the secure element domain are connected via a domain interface. The contact-less communication domain is configured to i) detect a radio frequency (RF) field of an external device and, upon detecting said RF field or upon receiving a first command from the external device, ii) send a priority request via the domain interface to the secure element domain. The secure element domain is configured to i) receive the priority request, and ii) identify whether the secure element domain is in a processing status, hereby a) upon identifying that the secure element domain is not in a processing status, approve the requested priority, and b) upon identifying that the secure element domain is in a processing status, deny the requested priority. Furthermore, the contact-less communication domain is configured to i) start a transaction in a priority status, when the priority request has been approved; and ii) start a mute status or remain in a mute status, such that the external device cannot detect the contact-less communication domain, when the priority request has been denied.

According to another exemplary embodiment, a mobile device is provided that comprises the electronic device described above. Hereby, the mobile device may be configured as a smart card or a mobile phone.

According to another exemplary embodiment, a communication system is provided that comprises the electronic device described above or the mobile device described above, and an external device, configured to provide the RF field and to detect the contact-less communication domain of the electronic device, when said contact-less communication domain is not in the mute status.

According to another exemplary embodiment, a computer program product (in particular a non-transitory computer program product) is provided, which is configured to (for example, by comprising specific instructions), when being executed on a processor (or a computer), cause the processor (or computer) to perform the method as described above.

In the context of the present application, the term "electronic device" may refer to any device that comprises an electronic component. An electronic device is for example a circuit, an integrated circuit (for example the SN100U from NXP), a processor, or a computing device that comprises a processor/integrated circuit.

In the context of the present application, the term "contact-less communication domain" may refer to a domain of an electronic device (such as an integrated circuit) that is configured for performing, or taking part in, a contact-less communication transaction. Hence, the contact-less communication domain may comprise a contact-less communication processor and/or a contact-less communication controller. The term "contact-less" may mean a wireless communication such as for example via NFC, RFID, WLAN, or Bluetooth. For this purpose, a contact-less communication domain may comprise a controller circuit (or processor) in order to manage the contact-less communication (e.g. an NFC controller). Furthermore, the domain may comprise an interface to an antenna (e.g. an NFC antenna). In another example, the domain may comprise the interface and the antenna.

In the context of the present application, the term "secure element domain" may refer to a domain of an electronic device that comprises a secure element. A secure element may be a specific storage unit that stores sensitive data such as user credentials which are mandatory to perform specific transactions. For example, if the secure element is built in a smart-phone, the operating system and other applications of the smart phone may not enter the data stored on the secure element. Hereby, the secure element may only be accessed by specific and authorized transactions (e.g. by an external reader device of a point of sale). The secure element in the present case may comprise two or more interfaces for different applications. In this manner, the secure element domain may also comprise two or more interfaces connected to the secure element. The secure element domain may comprise only the secure element or the secure element domain may comprise the secure element and further units. For example, the secure element may comprise a secure element operating system or the secure element domain may comprise the secure element and additionally a secure element operating system (e.g. on a further circuit/processor). The secure element domain may comprise one or more secure elements. The secure element may be an embedded secure element or a removable secure element. The secure element domain may comprise a UICC (or embedded UICC) and the secure element may be part of the (e)UICC or may be separate from the (e)UICC.

In the context of the present application, the term "processing status" may refer to a stale in which the secure element domain performs an activity with respect to the processing of data. A processing status may also be termed a "busy state". For example, an application protocol data unit (APDU) may be processed by the secure element domain such that the domain may be in a "busy" state. A processing status may also be a state in which an application is running on the secure element domain. In the processing status, the secure element domain may e.g. process an application, data units of an application, commands, or transactions.

In the context of the present application, the term "priority status" may refer to a status that is approved to an application upon request. The priority status may be approved only, when no other application is running (on the secure element domain) at the moment of approval. The term "priority status" may in particular refer to the circumstance, that while the application having the priority status is running, no other application is allowed to run. In an embodiment, a contact-less communication domain requests a priority status from a secure element domain such that no other application can start on the secure element domain, while the priority status is granted to the contact-less communication domain. In this manner, a contact-less transaction may be started (and/or be performed) without a delay that may be caused by another application. The priority status may hence be a contact-less (transaction) priority status. Furthermore, a "priority status" may refer to postponing or queuing any further request on other secure element interfaces.

In the context of the present application, the term "denying" may refer to the circumstance that a request and/or an application is at least temporally not accepted. Hence, "denying" may refer to setting the request/application to a pending status. In another embodiment, "denying" may refer to "rejecting".

In the context of the present application, the term "mute status" may refer to a status, wherein a contact-less communication domain nay be in a disabled (silent) status, wherein its presence cannot be detected by an external contact-less reader. The contact-less communication domain may be in the mute status during normal operation and only remove the mute status, when a priority request has been approved, or the contact-less communication domain may start the mute status only after a priority request has been denied. Therefore, the contact-less communication domain may either "start a mute-status" (upon a priority request is denied) or "remain in a mute status" that was already active at the time of sending the priority request.

According to an exemplary embodiment, managing priority in the context of a multiple interface secure element domain may be done in an efficient, secure and robust manner, when a contact-less communication domain performs a transaction with an external device only, when said contact-less communication domain is in a priority status with respect to the secure element domain (both domains are connected via a domain interface). Conventionally, the multiple interfaces of the secure element domain may result in delays of contact-less transactions (due to concurrent use case regarding the multiple interfaces) and thereby the transactions may fail. Now it has been surprisingly found, that the drawbacks from the prior art may be overcome, when the contact-less communication domain is set to or remains in a mute (silent) status (such that it cannot be detected by an external contact-less reader), when it is not in a priority status approved by the secure element domain. When another application/transaction is running on (processed by) the secure element domain, said domain may be in a busy state and will then deny the priority request. In this case, the contact-less communication domain may remain invisible for the external contact-less reader and no transaction will be started. However, when the secure element domain is in a free state and no application/transaction is running on (processed by) the secure element domain, the contact-less priority may be approved and the contact-less communication domain may start a transaction with the external contact-less reader in an efficient, secure, and robust manner.

In the following, further exemplary embodiments of the method, the electronic device, and the communication system will be explained.

According to an exemplary embodiment, the contact-less communication domain is a near field communication (NFC) domain. This may provide the advantage that an efficient, robust and established technology (in particular an established standard) can be directly applied for performing a contact-less communication.

In the context of the present application, the term "NFC" may refer to Near Field Communication which may be a short-range wireless technology (distances measured in centimeters) that is optimized for intuitive, easy, and secure communications between various devices without user configuration. In order to make two NFC devices communicate, users may bring them close together or even make them touch. The devices' NFC interfaces may automatically connect and configure themselves to form a peer-to-peer network. NFC may also bootstrap with other protocols, such as Bluetooth or Wireless Ethernet (WiFi), by exchanging configuration and session data. NFC may be compatible with contactless smart card platforms.

According to another exemplary embodiment, the method further comprises, upon identifying that the secure element domain is net in a processing status anymore (because the processing done by the secure element domain has been terminated), approving, in particular immediately approving, the requested priority. This may provide the advantage that the described method is fast and dynamically adapts to status changes.

According to another exemplary embodiment, the method further comprises denying (by the secure element domain) requests from further applications (in other words, other use cases that may occur in parallel to the contact-less communication domain use case), when the requested priority has been approved. This may provide the advantage that the priority status is realized in an efficient manner such that delays are avoided.

According to another exemplary embodiment, the method further comprises: i) terminating (by the contact-less communication domain) the mute status, when the requested priority has been approved, and subsequently ii) starting the priority status. The contact-less communication domain may remain in a mute status during normal operation and may then (immediately) terminate the mute status, when the priority request has been approved. This may provide the advantage that the contact-less transactions are more secure and efficient, because the contact-less communication domain may only be detectable to external devices, when having priority access to the secure element domain.

According to another exemplary embodiment, the method further comprises: i) receiving (by the contact-less communication domain being in the priority status) a contact-less application package from the external device, ii) passing the contact-less application package to the secure element domain via the domain interface, and subsequently iii) terminating (by the secure element domain) the priority status. This may provide the advantage that the electronic device functions in an efficient and fast manner, because, after the priority of the contact-less communication has been established, further requests to the secure element domain may be queued (and no "starvation" effects occur). In an embodiment, after sending the first application package, the contact-less communication domain may switch to a continuous processing according to Global Platform.

According to another exemplary embodiment, the method further comprises: i) sending (by the contact-less communication domain) a request for an extension of the priority status to the secure element domain, ii) approving (by the secure element domain) the requested extension of the priority status, and iii) starting a subsequent transaction (by the contact-less communication domain) in a further priority status. This may provide the advantage that also further communications can be performed in the priority status and without delays may lead to transactions failures. In the present context, the term "subsequent transaction" may for example refer to post-transaction procedures or sequential follow-on transactions. In an exemplary embodiment, it may be required that the secure element domain can distinguish between a (regular) priority request and a further (extension) priority request. For example, a priority session flag may contain 2 bits, one bit for the priority session request and a second bit for normal or extension priority request.

According to another exemplary embodiment, the method comprises terminating (by the secure element domain) the priority status after a predefined time limit. This may provide the advantage that situations such as "starvation" of the secure element domain or "dead lock" (both sides are waiting for the other to release/grant) do not occur. The lime limit may be set to a reasonable value. The reasonable value may be larger than the typical contact-less transaction time. For example, around 400 msec results in good response time to other interface commands, allowing for a contact-less transaction initiation to start without being disturbed. Furthermore, the value shall be configurable/adjusted to meet field/interoperability requirements. In an exemplary example, the particular value can be set to 800 msec, due to a requirement of responding on the other secure element interface in less than 1 sec.

According to another exemplary embodiment, the contact-less communication domain comprises an NFC controller. Furthermore, the domain may comprise an NFC antenna interface or an NFC antenna. This may provide the advantage that an efficient, secure, and established technology can be directly implemented. An NFC controller may for example be a processor that controls NFC related processes. An NFC antenna may be part of the electronic device or the mobile device and the contact-less communication domain may be connected to said antenna via an NFC antenna interlace.

According to another exemplary embodiment, the secure element domain comprises a secure element and a secure element domain operating system, wherein the secure element domain operating system has a scheduling algorithm, in particular is single-threaded. Furthermore, the secure element comprises two or more secure element interfaces. This may provide the advantage that, even though the operating system is single-threaded, the priority with respect of the multiple interfaces can be managed in an efficient and robust manner. The term "scheduling algorithm" may refer to the circumstance that an operating system comprises rules of how to schedule incoming requests. A "scheduling algorithm" may for example comprise one of the following algorithms: single-threaded, first-come-first-serve, round robin, pre-emption, and non pre-emption.

According to another exemplary embodiment, the electronic device is configured as an integrated circuit, and wherein the contact-less communication domain and the secure element domain are integrated into said integrated circuit. In an exemplary embodiment, the electronic device is an SN100U chip from NXP. This may provide the advantage, that efficient and established technology can be directly applied. In an embodiment, the contact-less communication domain and the secure element domain may be monolithically integrated.

According to another exemplary embodiment, the external device is configured as one of the group consisting of a contact-less reader, a point of sale, a trusted service manager, or a transaction terminal. This may provide the advantage that the described electronic device/portable device can interact with secure and established technologies.

The aspects defined above and further aspects are apparent from the examples of embodiment to be described hereinafter and are explained with reference to these examples of embodiment.

BRIEF DESCRIPTION OF THE DRAWINGS

The illustrations in the drawings are schematic. In different drawings, similar or identical elements are provided with the same reference signs.

DESCRIPTION OF EMBODIMENTS

Figure 1:
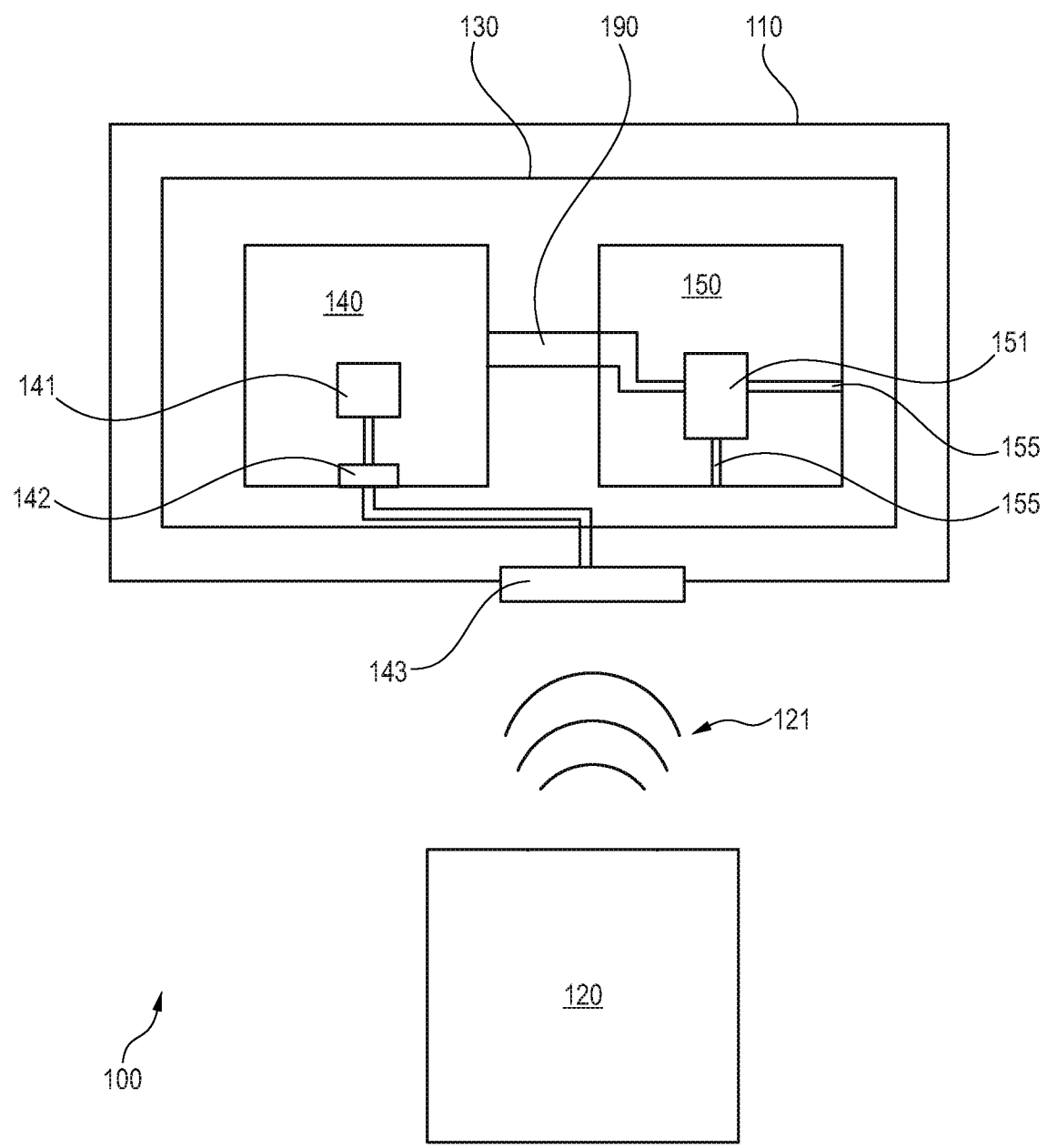
FIG. 1 illustrates an exemplary embodiment of a communication system comprising an electronic device, having a contact-less communication domain and a secure element domain, and an external contact-less reader device.

Before, referring to the drawings, exemplary embodiments will be described in further detail, some basic considerations will be summarized based on which exemplary embodiments of the invention have been developed.

According to an exemplary embodiment of the invention, the following issues may occur due to the delays in a multiple interface secure element domain environment: i) failure of contact-less transaction from delayed processing of contact-less commands waiting for another secure element command over another interface (e.g. platform security/card content management from AP (application protocol) over SPI (serial peripheral interface). APDU gate, telecom profile installation or network authentication over a ISO7816 UART from modem) to be completed, ii) a bad user experience due to inconsistency in transaction success, iii) interoperability failure in field and reporting of false problems for contact-less transactions, and iv) certain infrastructure (transit or payment) may temporarily disable service on readers where multiple back-to-back transactions fail.

According to an exemplary embodiment, the following steps may be performed during the described method: i) the card (secure element domain) OS is considered as a system "resource", ii) the present status of the card OS resource indicates, whether it is under use or free, iii) an NFC controller (e.g. of a contact-less communication domain) requests and acquires priority for the card OS resource, iv) the card OS receives the NFC controller priority request, v) the card OS grants (when the card OS is free) the NFC controller priority request, vi) the card OS identifies conditions and/or time for maintaining the priority status, vii) the card OS releases the priority status, when the conditions to release are reached, viii) the NFC controller requests an extended priority in an ongoing contact-less session for supporting special requirements, ix) the card OS receives die NFC controller extended priority request, x) the card OS identifies conditions and/or time for maintaining the extended priority, xi) the card OS releases the extended priority status, when die conditions to release are reached, xii) starvation of non-contact-less application is avoided by identifying resource hogging conditions during the contact-less priority status, and xiii) race-condition (false priority grant) and dead-lock (both sides waiting for the other to release/grant) are avoided during the priority request and grant mechanism.

FIG. 1 illustrates a communication system 100 according to an exemplary embodiment. The system 100 comprises a mobile device 110 which is a smart card, a PDA, or a smart phone and an external device 120 which is a contact-less reader of a point of sale. The mobile device 110 comprises an electronic device 130 that is configured as an integrated circuit, for example an SN100U. The electronic device 130 comprises a contact-less communication domain 140 and a secure element domain 150 with two or more interfaces 155 (in particular, a secure element 151 in the secure element domain 140 comprises multiple interfaces 155). The multiple interfaces 155 are only shown schematically in FIG. 1; for a detailed exemplary embodiment of the interfaces, please see FIG. 3 below. The contact-less communication domain 140 and the secure element domain 150 are hereby integrated onto the same chip 130 and are connected via a domain interface 190. The contact-less communication domain 140 comprises an NFC controller 141 and an NFC antenna interface 142. The NFC antenna interface 142 is connected to an antenna 143 of the mobile device 110. The external device 120 provides a radio frequency field 121, for example NFC, which can be received by the antenna 143 and then, via the NFC antenna interface 142, be detected by the NFC controller 141. Furthermore, the external device 120 is configured to detect the presence of the NFC controller 141 in the electronic device 130, when the NFC controller 141 is not in a mute status. The electronic device 130 is configured to perform the method described below with respect to FIG. 2. Hence, when the NFC controller 141 switches into a mute status or remains in a mute status (because no priority for a contact-less transaction is approved by the secure element domain 150), the external device 120 is not able to detect the presence of the NFC controller 141 anymore. In this manner, a contact-less transaction between the portable mobile device 110 and the external device 120 can only take place, when the contact-less communication domain 130 is in a priority states and other applications (parallel use-cases) are blocked by the secure element domain 140.

Figure 2:
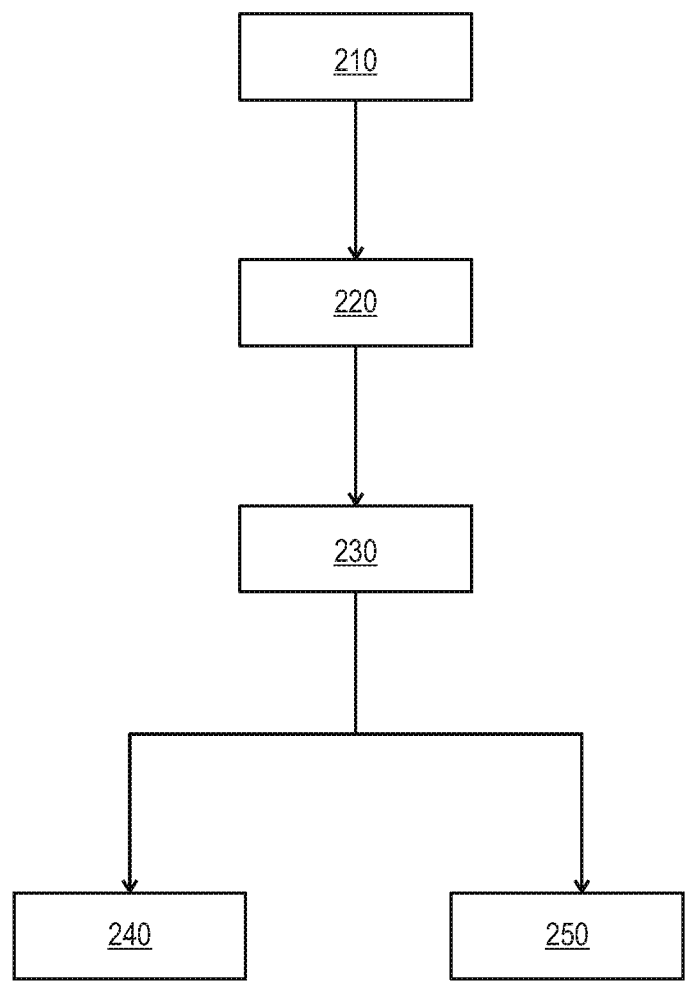
FIG. 2 illustrates a method of managing priority in the context of a secure element domain with multiple interfaces.

FIG. 2 illustrates a method, according to an exemplary embodiment, of managing the electronic device 130 comprising the contact-less communication domain 140 and the secure element domain 150, wherein the contact-less communication domain 140 and the secure element domain 150 are connected via the domain interface 190, and wherein the secure element 151 comprises two or more secure element interfaces 155. In a first step 210, the contact-less communication domain 140 detects an RF field 121 of an external device 120. Upon detecting said RF field 121, the contact-less communication domain 140 sends in a second step 220 a priority request, via the domain interface 190, to the secure element domain 150. In a third step 230, the secure element domain 150 receives the priority request and identifies whether an application is running on the secure element domain 150 or not (in other words, if the secure element domain 150 is in a processing status ("busy"). Upon identifying that no application is running on the secure element domain 150 (the secure element domain 150 is not in a processing status ("free")), the secure element domain 150 approves the requested priority in step 240, and the contact-less communication domain 140 starts a transaction in a priority status. Upon identifying that an application is already running on the secure element domain 150, the secure element domain 150 denies in step 250 the requested priority, and the contact-less communication domain 140 starts (or remains in) a mute status, such that the external device 120 cannot detect the contact-less communication domain 140 and no contact-less transaction is started.

Figure 3:
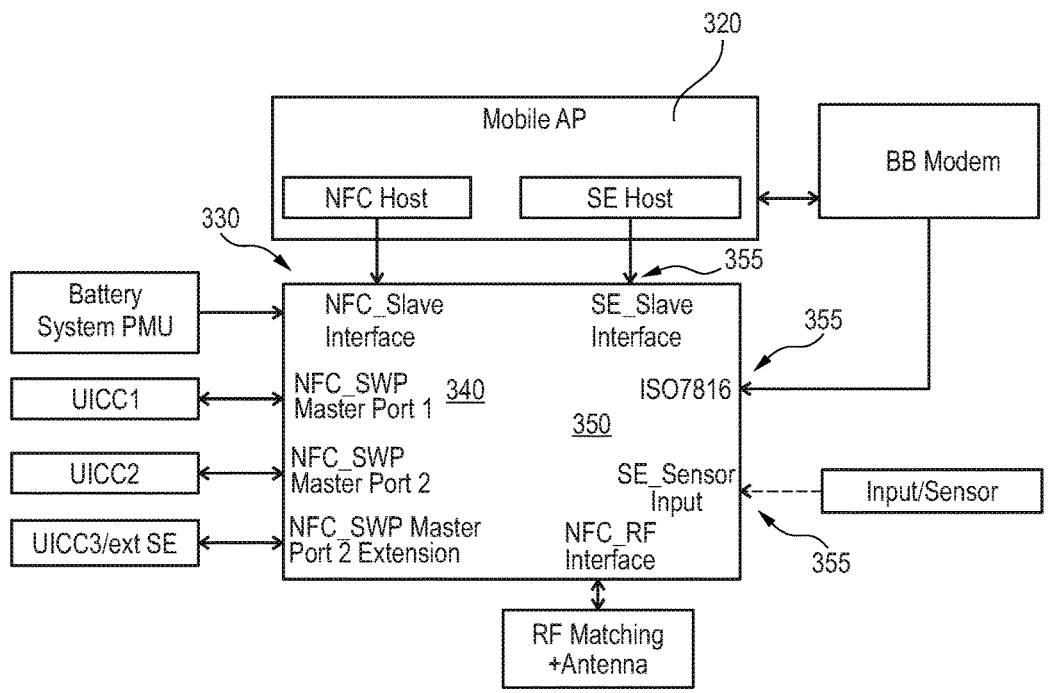
FIG. 3 illustrates an example of an integrated circuit from the prior art.

FIG. 3 illustrates an SN100U chip 330 from NXP as a prior art example. Said chip comprises an embedded secure element in a secure element domain 350, and a secure NFC domain 340. The chip 330 is for mobile devices (e.g. smart phones) and supports multiple interfaces (e.g. NFC to contact-less. NFC to host, SPI, ISOUART, I2C) towards different hosts like an external contact-less reader 320, an application processor, a TEE, or a (baseband) modem. The secure element domain 350 of this chip 330 comprises multiple interlaces 355 and use cases of the different interfaces 355 can occur in parallel.

Figure 4:
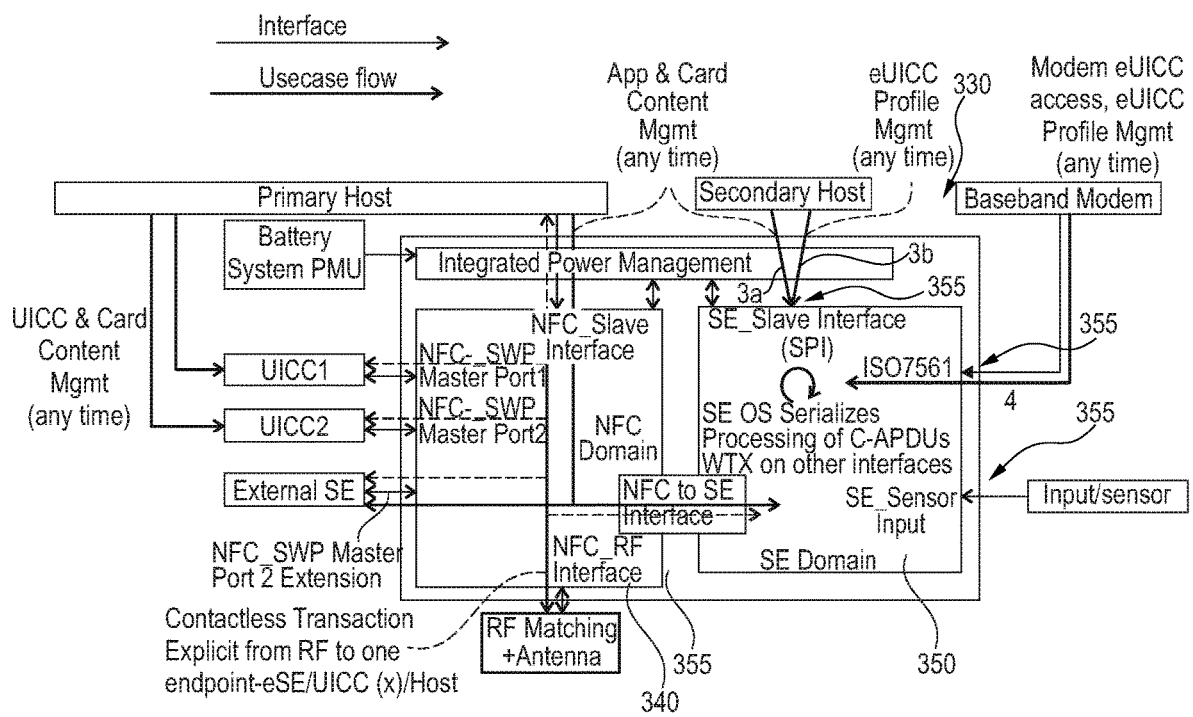
FIG. 4 illustrates an example of parallel application requests in said circuit from the prior art.

FIG. 4 illustrates the different interfaces 355 of the prior art chip 330 (described for FIG. 3 above) and corresponding use cases that could occur in parallel. Parallel requests arriving to the secure element domain 350, in particular any time, are served on a first-come-first-served basis as the secure element domain 550 operating system has a scheduling algorithm. For example, the operating system is single-threaded. As an effect of this, all queued requests pend (with support of wait time extension) until the ongoing request is responded. In case of a pre-emptive scheduling, the pending will be for the duration of context save of ongoing operation and creating/switching to the context for the contactless transaction. If the ongoing operation is in a critical section then this can be interrupted for context saving only after completion of the critical section. Such delays in response, although valid from protocol perspective, is not accepted by some contact-less applications implementations like MIFARK, FeliCa and secure payment applications. These applications time-out on delayed response and expected transaction fail. In certain infrastructures like transit gates, a few back-to-back transaction failures can result in temporary blocking of the gate assuming it is a tampering attack. In the SN100U chip 330, the possibility of concurrent use case from contact interface delaying contact-less transactions is further increased by the eUICC use cases from the modem (using ISO7816 contact communication) and also eUICC profile management function running on SPI, which will occur more frequently, in parallel, and independent of contact-less use-cases such as contact-less transactions to external devices.

The following exemplary examples of the FIGS. 5 to 10 describe implementations of the method of managing priority in an electronic device in the NXP SN100U chip.

Figure 5:
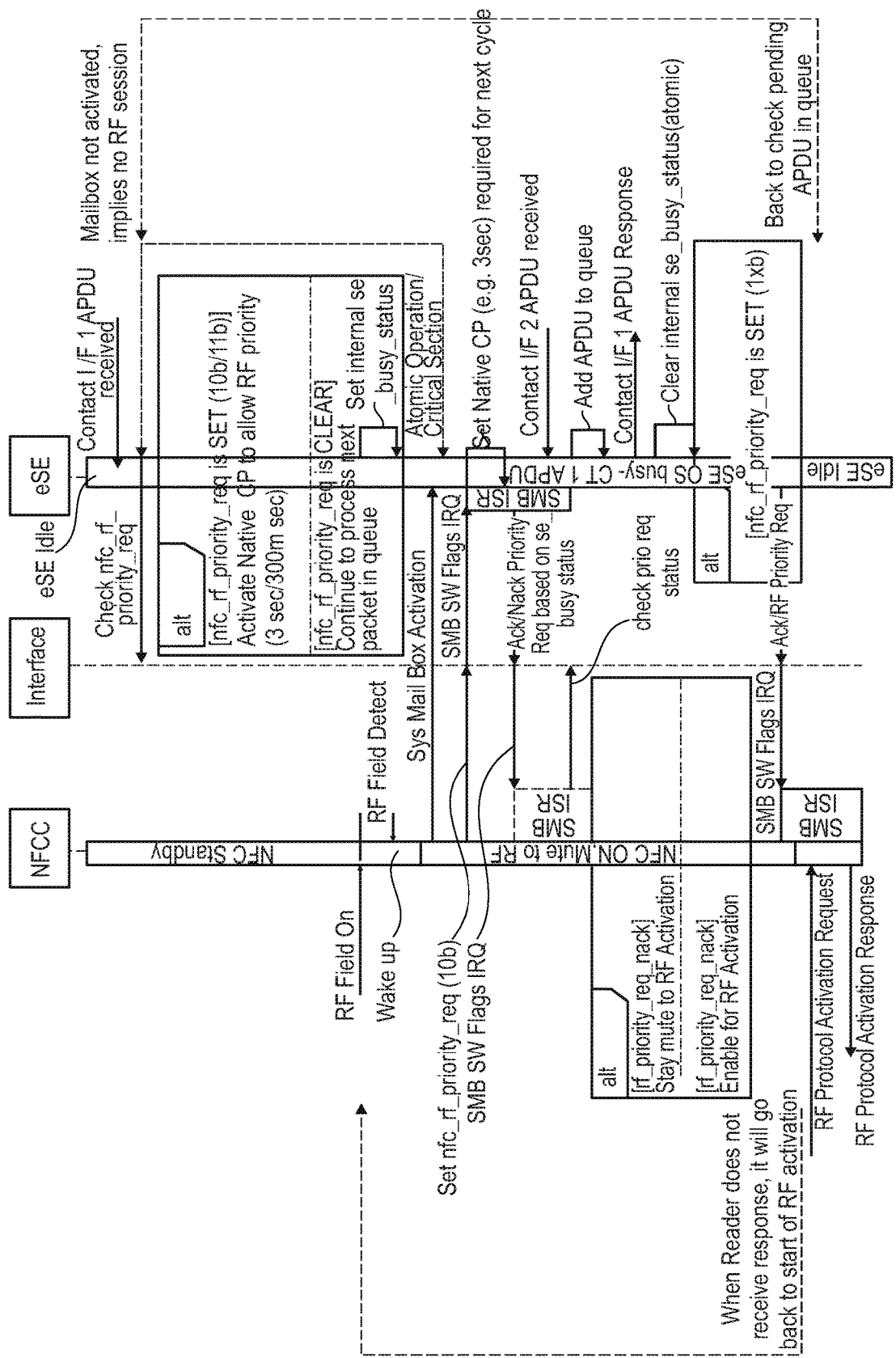
FIGS. 5 to 10 illustrate exemplary embodiments of the method of managing priority in the context of a secure element domain with multiple interfaces.

FIG. 5 illustrates an exemplary embodiment of an SN100U implementation of an NFC controller 141 (being part of a contact-less communication domain 140) and an (embedded) secure element 151 (being part of a secure element (SE) domain 150) mutual exclusion pattern to allow for a contact-less transaction to request and gain temporary, time bound, priority for execution over other interface packets arriving to the SE domain 150. The general outline of the solution can be as follows: i) the NFC domain 140 requests a SE domain 150 contact-less priority whenever it detects ail RF field 121 from an external reader device 120, ii) the SE domain 150 indicates to the NFC domain 140 via a (system mail box) domain interface 190, whether the contact-less priority request is granted and or not granted (for example, when the SE domain 150 is "busy" processing another interface, e.g. an APDU), iii) the NFC domain 140 remains in a mute state (silent) to the external reader device 120 until the SE domain 150 grants NFC domain contact-less priority at one of the following two: a) immediately, if no other application (e.g. APDU) processing is ongoing on the SE domain 150, b) after completion of an on-going application (e.g. APDU) processing on the SE domain 150. As the NFC domain 140 remains in the mute status until this time, the reader device 120 does not observe any presence of the NFC domain 140 (hence also not the presence of the smart card) and hence will not report any failed transaction. The following steps can be performed as well: iv) the NFC domain 140 contact-less priority request is only applied until the first application packet is handed over to the SE domain 150 for processing. After this, the Global Platform specified "continuous processing" can provide further application level priority. If application level priority is not requested by the application, then further application packets are served on a first-come-first-served basis; v) the NFC domain 140 may request a short extension of contact-less priority at the end of the contact-less (RF) session to allow handling of post transaction procedures or sequential follow-on transactions. At the time of start of the RF session, it is not known which destination will be used for the transaction. Hence an NFC controller-priority logic may apply for all card emulation scenarios. Consequently, the contact-less session priority is cleared immediately on identifying that the target destination selected is other than the SE domain 150.

Figure 6:
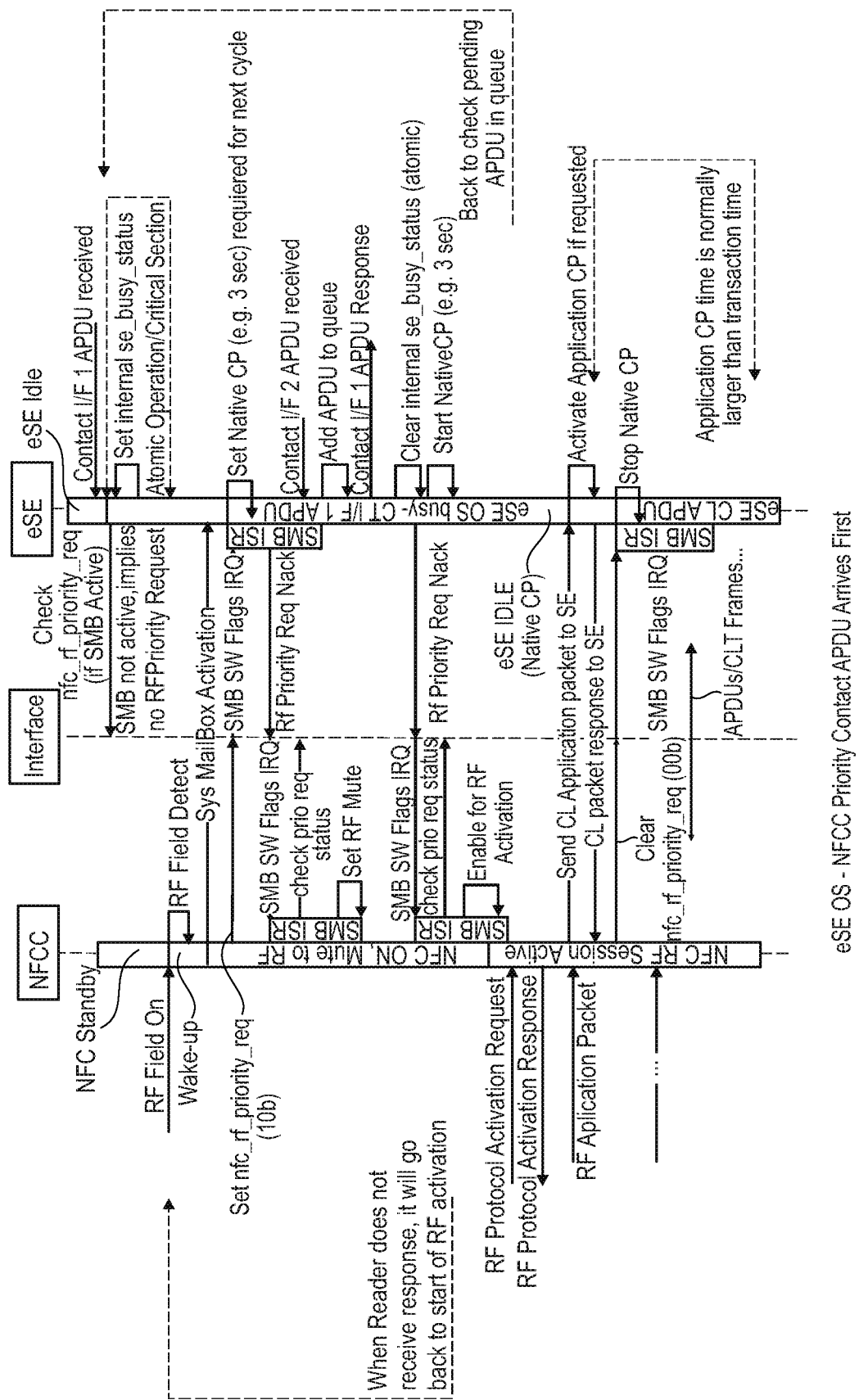

FIG. 6: In this exemplary embodiment, the SE domain 150 receives a contact APDU first. Then, the SE domain 150 checks for an RF priority request (indicator) from the NFC controller 140 and, if not set, the SE domain 150 proceeds with setting the internal status to "busy" and processes the APDU. When the NFC controller 141 then detects an RF field 121, it sets the RF priority request, and waits for an approval from the SE domain 150. On reception of the RF priority request, the SE domain 150 responds with "denied", as it is already busy processing the other contact APDU. The NFC controller 141 checks the SE domain 150 "busy" status and decides to stay in the "mute status". Subsequently, when the SE domain 150 completes the contact APDU processing, it again checks the RF priority request before processing any further APDU. As the priority request is set, the SE domain 150 enters into the contact-less priority status, sends a RF priority request approval to the NFC domain 140, allowing for the contact-less transaction to start on the next cycle from the external reader device 120. Any new contact APDUs arriving during this phase are pended in the queue for later processing.

Figure 7:
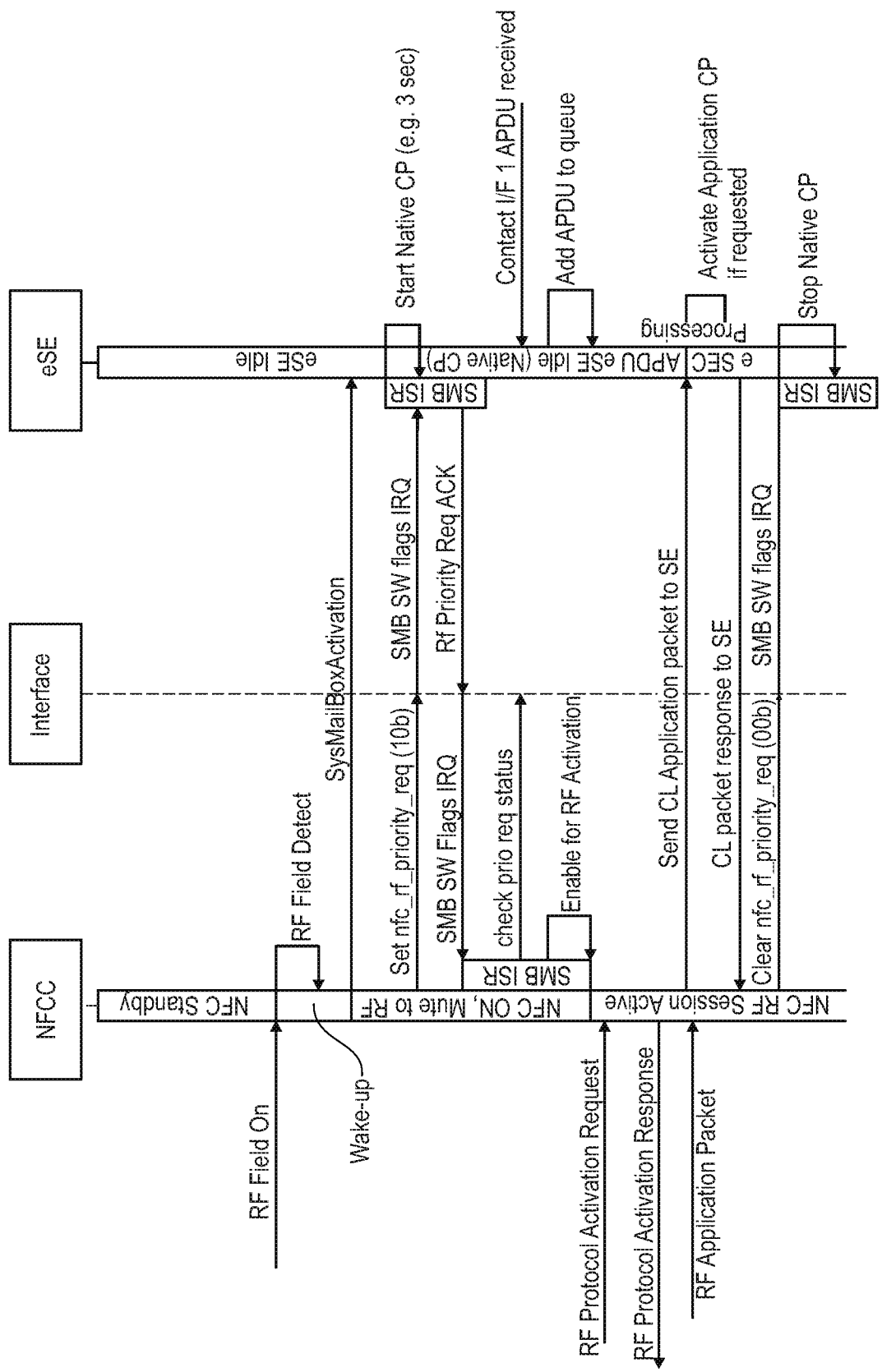
Figure 7:
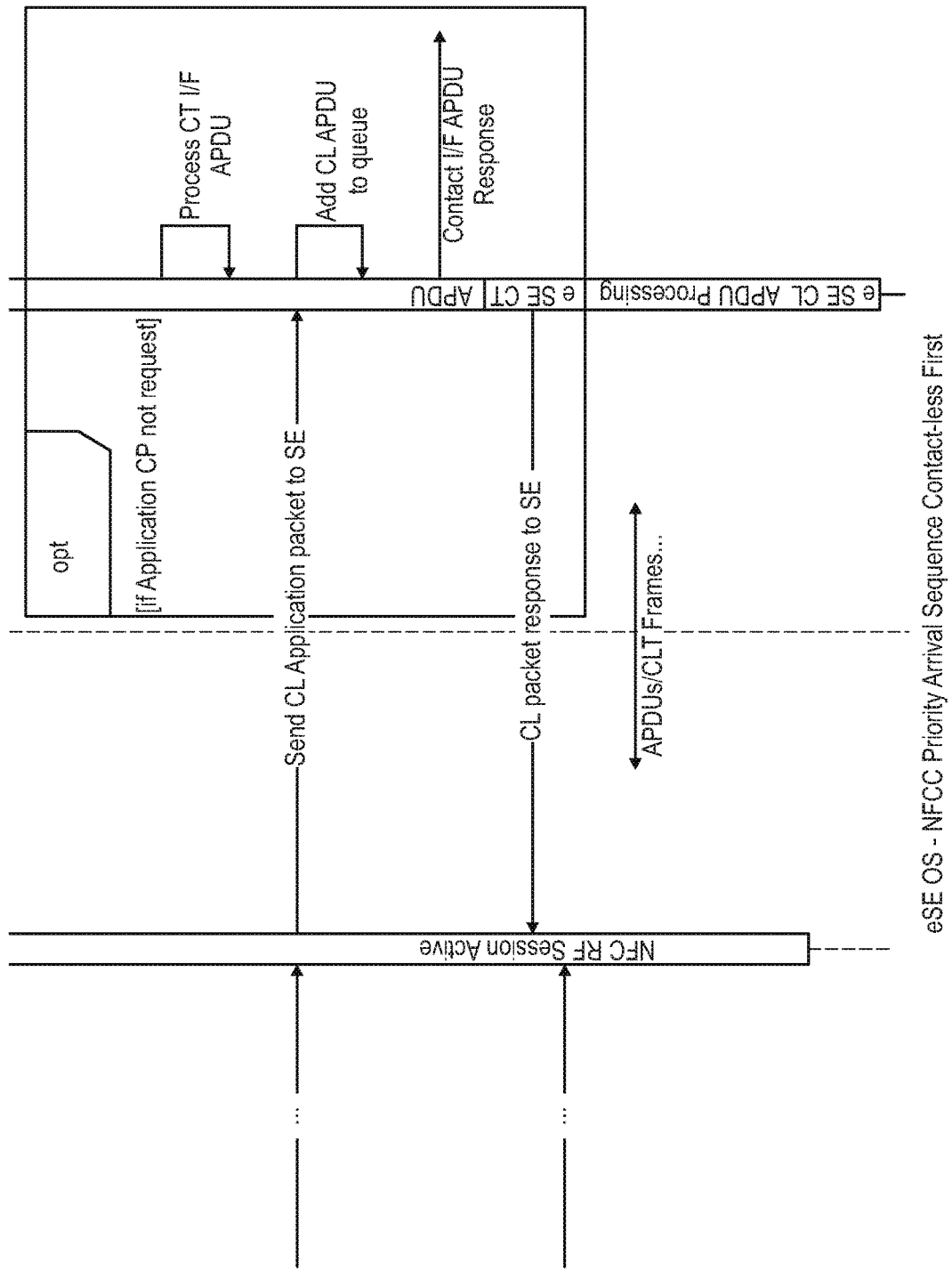

FIG. 7: In this exemplary embodiment, the NFC domain 140 detects the RF field 121, sets the RF priority request and waits for RF priority request approval/disapproval from the SE domain 150. On reception of the RF priority request, the SE domain 150 responds with approval as no other APDU is under process and enters enter the contact-less priority state. The NFC domain 140 checks the SE domain 150 "busy state" and proceeds with the RF transaction process. During the contact-less priority, the SE domain 150 awaits the first contact-less APDU or CLT (contact-less tunneling) frame to be received. Any contact APDUs arriving during this phase are pended in the queue for later processing. Subsequently, when the NFC domain 140 completes the contact-less activation and forwards the first APDU to SE domain 150, the SE domain 150 processes the APDU and activates application level "continuous processing" as required and sends the response to the request. On reception for the response, the NFC domain 140 clears the RF priority request.

Figure 8:
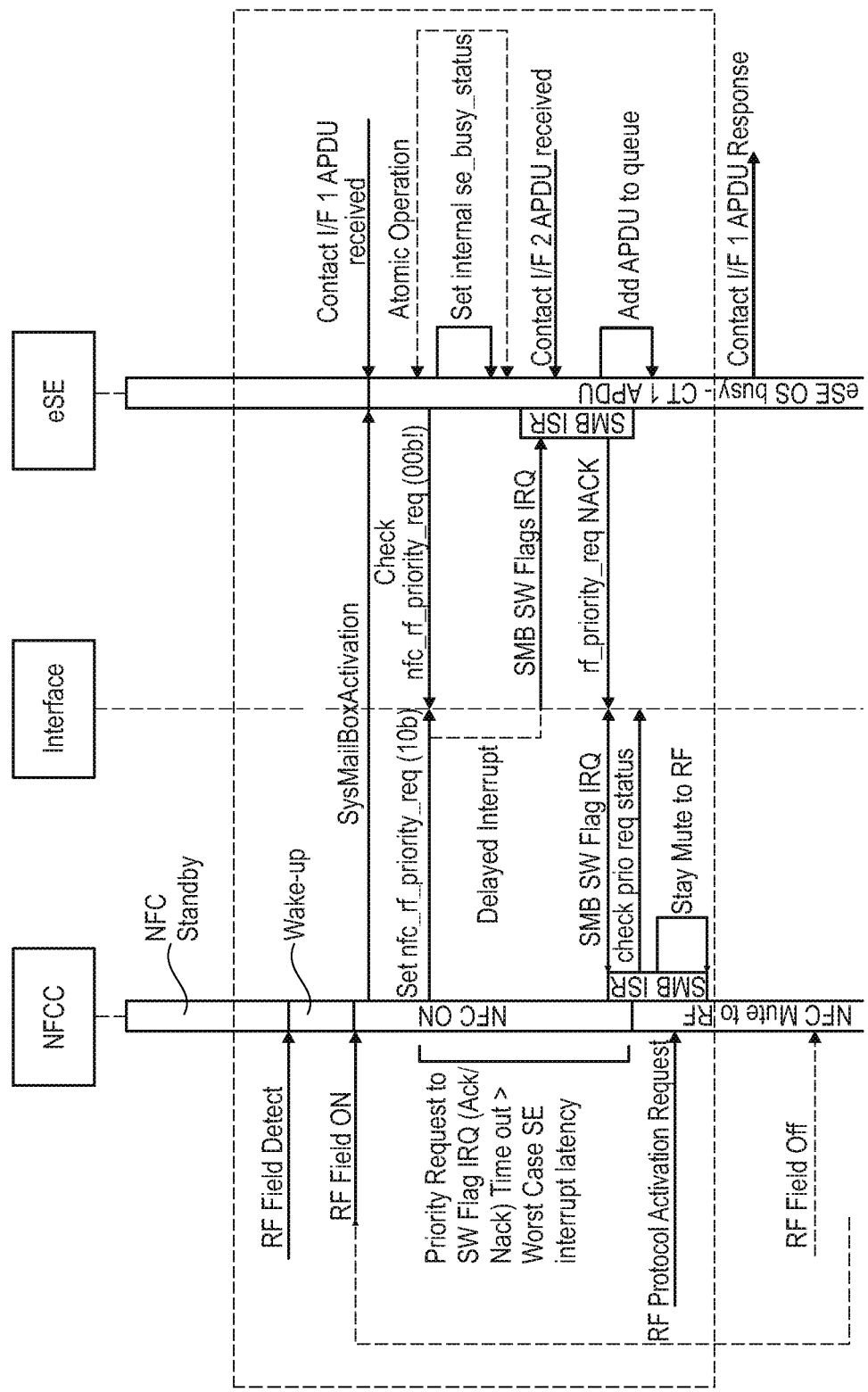
Figure 8:
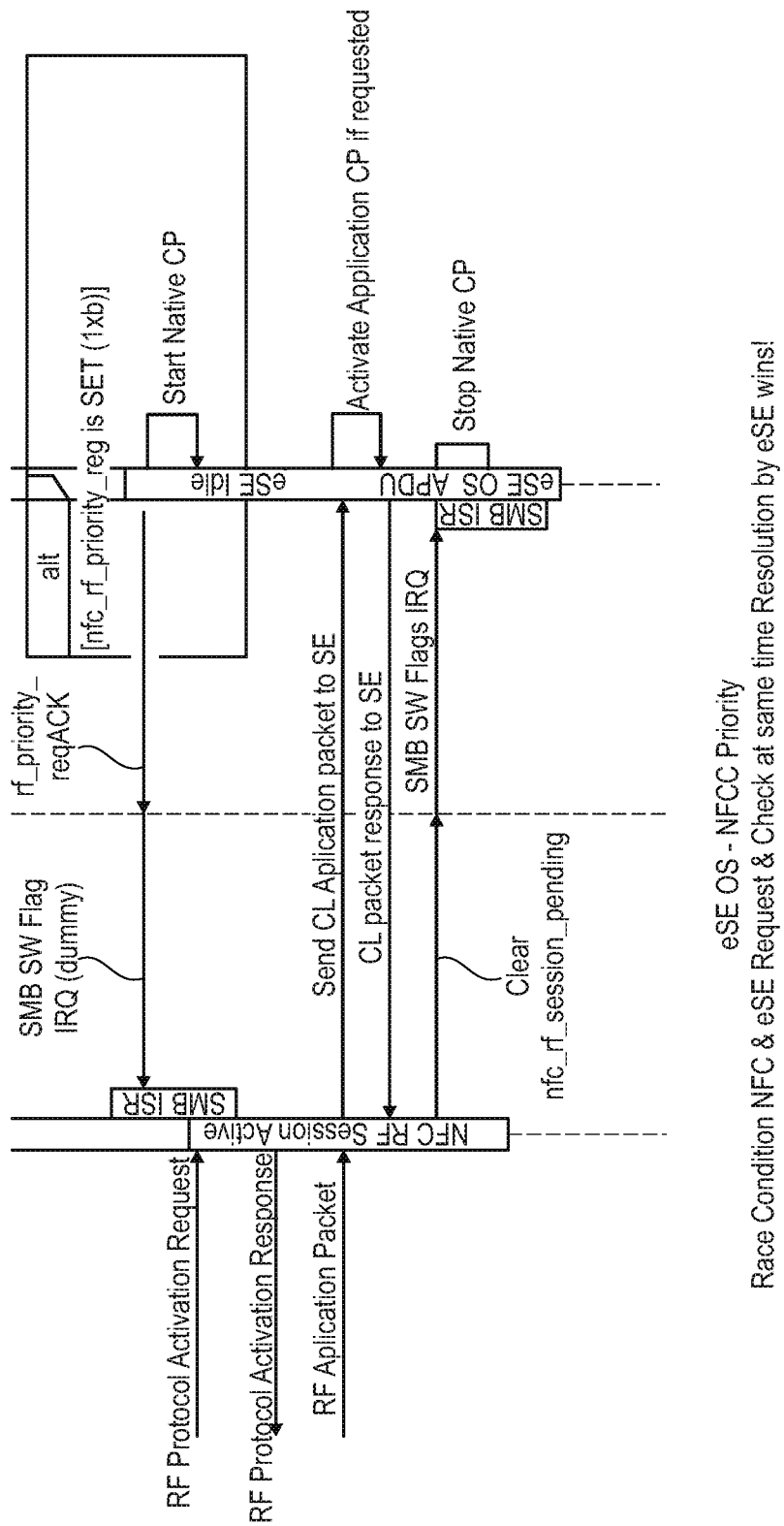

FIG. 8: In this exemplary embodiment, the contact-less transaction starts and the contact APDU arrives at same time, leading to a possible failed priority check with "set" and "check" happening at the same time from both sides. In this case, there are two potential race conditions:

1. When the NFC domain 140 sets the RF priority request and the SE domain 150 is performing the check at the same time. This can be resolved deterministically by: i) NFC RF priority request indicator is a "request" and not an indicator of blocking the resource, ii) SE domain 150 "busy status" is an indicator of resource being "blocked". The SE domain 150 then goes ahead with blocking the resource if it has not seen the request indicator, even if it was just being set at the time of check. The above described ensures a deterministic result of the "check" and "set", resulting in that the SE domain 150 processes the contact APDU and the NFC domain 140 waits for the next cycle for the SE domain 150 to wait for the contact-less RF priority request.

2. When the NFC domain 140 checks the "busy" status and the SE domain 150 sets the "busy status" at the same time. This is avoided to occur by: i) the SE domain 150 RF priority request "check" and "set" of the SE domain "busy" steps are defined to be atomic, with deterministic execution time, ii) the NFC domain 140 waits for RF priority interruption to be triggered by the SE domain 150 to perform the SE "busy" check, iii) A (new) step ii) can have a specified time limit of worst ease interrupt latency (to be specified) of the SE domain 150 beyond which the NFC domain 140 shall consider it as an exception condition and report as the SE domain 150 is not responding.

Figure 9:
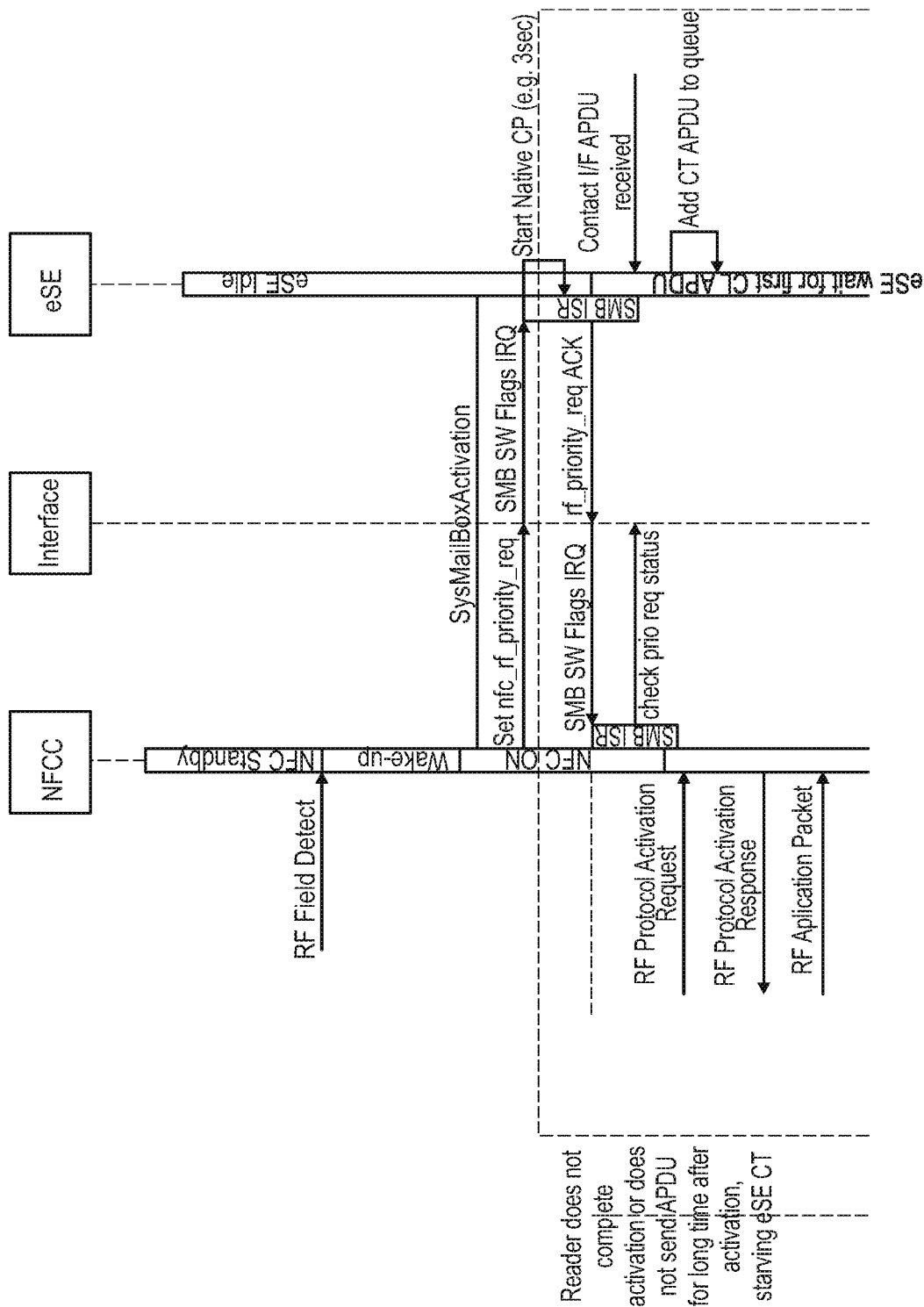
Figure 9:
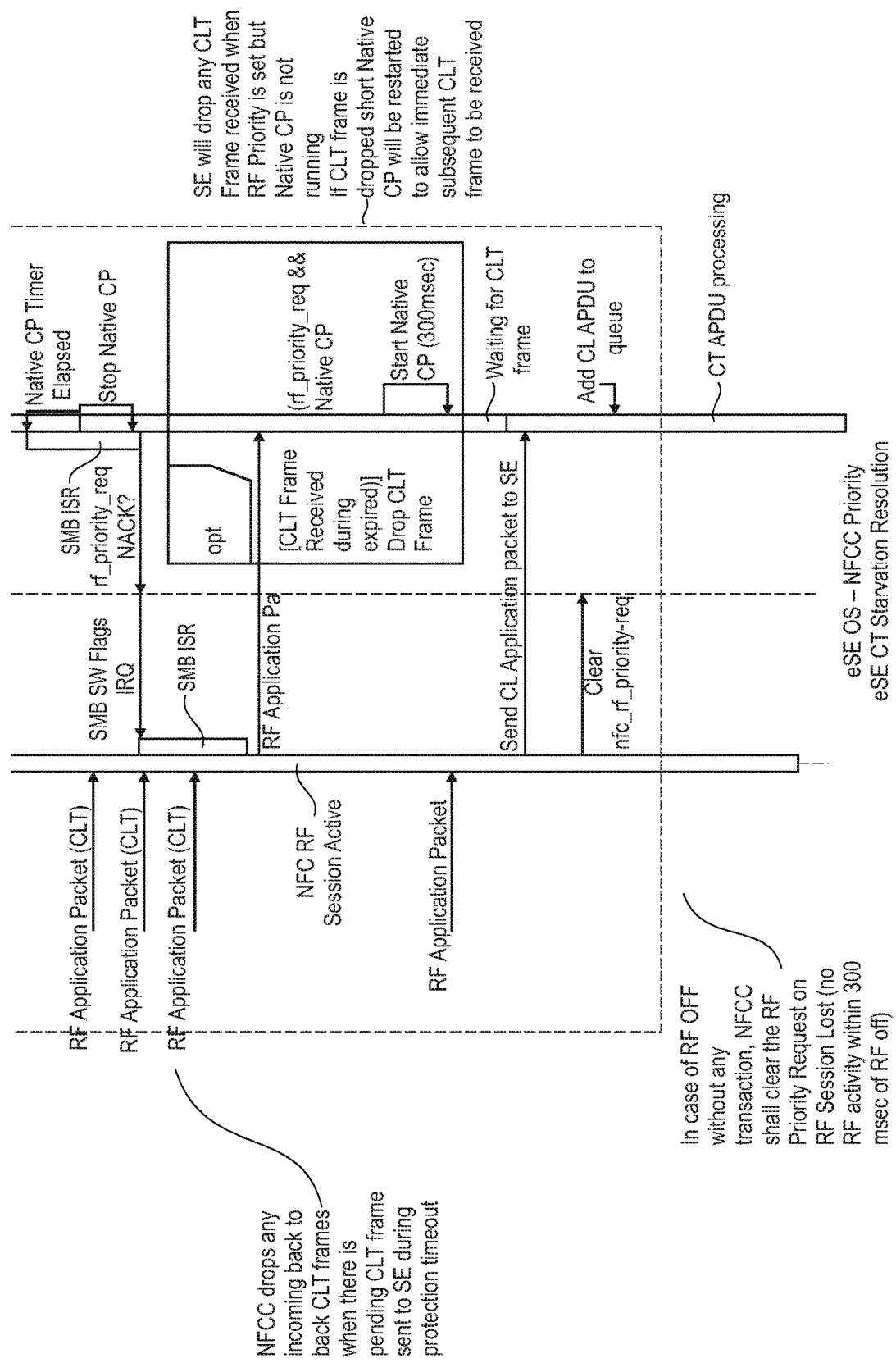

FIG. 9: In this exemplary embodiment, it can happen that the NFC domain 140 detects an RF field 121 and the contact-less session priority request is approved, but for some reason, the external reader 120 does not proceed with further RF activation and transaction for a long time. This would lead to the hogging of the priority on NFC side and the contact interface on the SE domain 150 will start to "starve", even though there is no real operation on-going on in the contact-less transaction. The starvation can be resolved by forced exit of the contact-less priority mode by the SE domain 150 after a defined time-out. This can be specified as for example 3 seconds. In case that the contact-less transaction is started later than this by the external reader 120, then it can be processed in the default first-come-first served priority by the SE domain 150. As special handling for CLT frames, the SE domain 150 can drop first CLT frame received, when the native CP session has expired. In order to allow a retry of the CLT frame to succeed, the SE domain 150 can enter a short native CP in this condition. The NFC domain 140 can drop further CLT frames to avoid a second CLT frame being sent to the SE domain 150, while a previous one is still assumed to be pending for response. On response time-out, the NFC domain 140 forwards the CLT frame. As the short native CP (around 300 msec) time is larger than the CLT response time-out of 10 msec, it allows for a CLT retry to succeed without getting interfered with a contact APDU processing.

Figure 10:
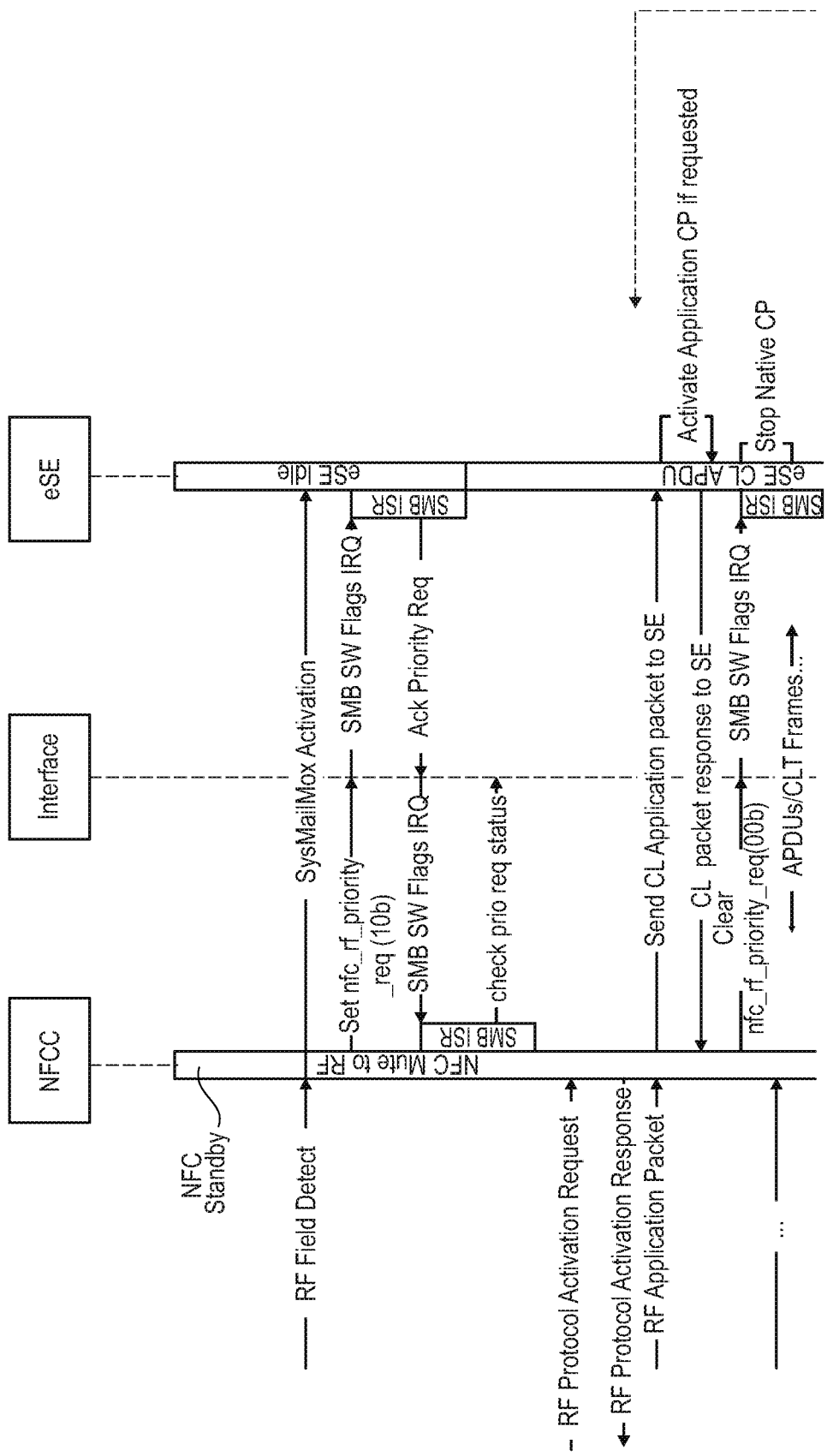
Figure 10:
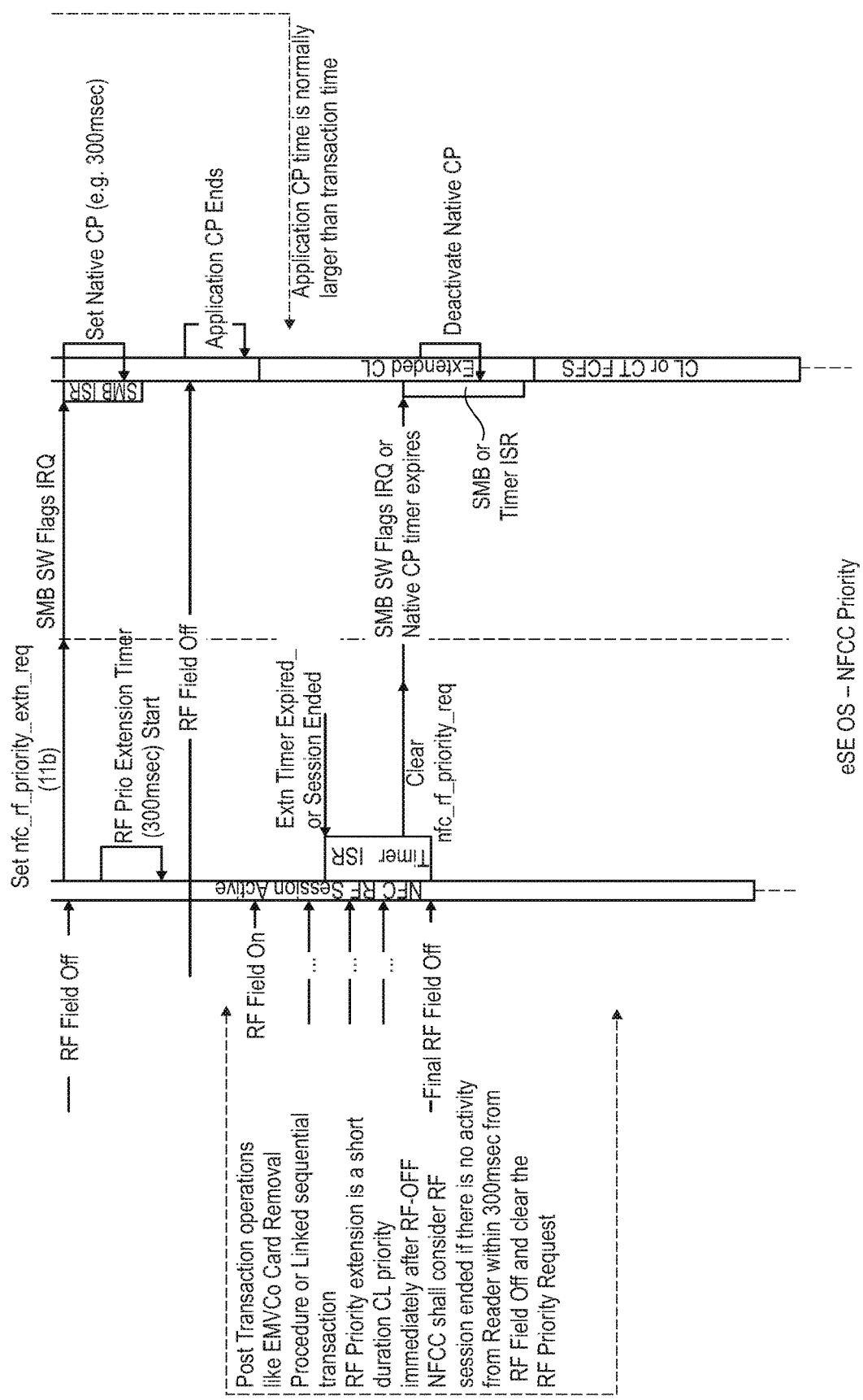

FIG. 10: In this exemplary embodiment, in case of an EMV (Europay International, MasterCard and VISA) Co payment, at the end of a transaction the external reader 120 performs a card removal procedure (a.k.a card presence check) which involves RF-off, reactivation and some optional communication with the card. In the priority design as defined above, the SE domain 150 will start processing the contact APDU at the end of a contact-less transaction as an application level contact-less continuous processing will be terminated on application deselection. In such case, where the SE domain 150 "busy" indicator is set, the NFC domain 140 will slay in the "mute" status during the presence check and the EMVCo reader may falsely report "card removed". This special case can be handled as follows: i) on RF field-off, the NFC domain 140 reasserts the request RF priority request to request extension of the contact-less priority (dedicated bit to indicate extension request), ii) the SE domain 150 starts an RF priority extension session (e.g. 300 msec), iii) the NFC domain 140 starts an RF session extension timer for the specified duration of typical start of post transaction procedure, iv) the NFC domain 140 forwards the RF field-off event to the SE domain 150, which on the SE domain 150 side will lead to deselection of the application and termination of the application level contact-less continuous processing, vi) as the native CP is active, any CT APDU on the SE domain 150 side will pend until this is exited, vii) a start of the EMVCo card removal procedure during such time of RF session extension time will be responded correctly by the NFC domain 140 and avoids a false "card removed" indication, and viii) after expiry of the RF session ex tension timer, irrespective of whether any external reader 120 procedure was started or not, the RF priority request will be cleared, allowing the SE domain 150 to continue with queued contact APDU processing.

In this specification, example embodiments have been presented in terms of a selected set of details. However, a person of ordinary skill in the art would understand that many other example embodiments may be practiced which include a different selected set of these details. It is intended that the following claims cover all possible example embodiments.

REFERENCE NUMERALS

100 Communication system
110 Mobile device
120 External device
121 Radio frequency field
130 Electronic device, integrated circuit
140 Contact-less communication domain
141 NFC controller
142 NFC interface
143 NFC antenna
150 Secure element domain
151 Secure element
155 Interfaces
190 Domain interface
320 Prior art external reader
330 Prior art chip
340 Prior art NFC controller
350 Prior art secure element domain
355 Prior art interfaces

The invention claimed is:

1. A method of managing priority in an electronic device, wherein the electronic device comprises a contact-less communication domain and a secure element domain, wherein the contact-less communication domain and the secure element domain are connected via a domain interface, and wherein the secure element domain comprises two or more interfaces, the method comprising:

detecting, by the contact-less communication domain, a radio frequency, RF, field of an external device and, upon detecting said RF field or upon receiving a first command from the external device, sending a priority request via the domain interface to the secure element domain;

receiving, by the secure element domain, the priority request and identifying whether the secure element domain is in a processing status, hereby upon identifying that the secure element domain is not in the processing status, approving, by the secure element domain, the requested priority, and starting a transaction, by the contact-less communication domain, in a priority status; and upon identifying that the secure element domain is in the processing status, denying, by the secure element domain, the requested priority, and starting a mute status or remaining in a mute status, by the contact-less communication domain, wherein the external device cannot detect the contact-less communication domain when the contact-less communication domain is in a mute status; and denying, by the secure element domain, requests from further applications, when the requested priority has been approved.

2. The method according to claim 1, wherein the contact-less communication domain is a near field communication, NFC, domain.

3. The method according to claim 1, further comprising:
upon identifying that the processing status of the secure element domain has been terminated, approving the requested priority.

4. The method according to claim 1, further comprising:
terminating, by the contact-less communication domain, the mute status, when the requested priority has been approved, and subsequently
starting the priority status.

5. The method according to claim 1, further comprising:
receiving, by the contact-less communication domain being in the priority status, a contact-less application package from the external device;
passing the contact-less application package to the secure element domain via the domain interface, and subsequently
terminating, by the secure element domain, the priority status.

6. The method according to claim 1, further comprising:
sending, by the contact-less communication domain, a request for an extension of the priority status to the secure element domain,
approving, by the secure element domain, the requested extension of the priority status, and starting a subsequent transaction, by the contact-less communication domain, in a further priority status.

7. The method according to claim 1, further comprising:
terminating, by the secure element domain, the priority status after a predefined time limit.

8. An electronic device comprising:
a contact-less communication circuit domain; and
a secure element circuit domain which comprises two or more interfaces;
wherein the contact-less communication circuit domain and the secure element circuit domain are connected via a domain interface;
wherein the contact-less communication circuit domain is configured to:

detect a radio frequency, RF, field of an external device and, upon detecting said RF field or upon receiving a first command from the external device, send a priority request via the domain interface to the secure element circuit domain; and terminate a mute status, when the requested priority has been approved, and subsequently starting a priority status;

wherein the secure element circuit domain is configured to receive the priority request and identify whether the secure element circuit domain is in a processing status, hereby upon identifying that the secure element circuit domain is not in a processing status, approve the requested priority, and upon identifying that the secure element circuit domain is in a processing status, deny the requested priority;

wherein the contact-less communication circuit domain is further configured to start a transaction in a priority status, when the priority request has been approved; and start a mute status or remain in a mute status, wherein the external device cannot detect the contact-less communication circuit domain that is in the mute status, when the priority request has been denied.

9. The electronic device according to claim 8, wherein the contact-less communication circuit domain comprises an NFC controller.

10. The electronic device according to claim 9, wherein the secure element circuit domain comprises a secure element and a secure element circuit domain operating system, and wherein the secure element circuit domain operating system has a scheduling algorithm, in particular is single-threaded.

11. The electronic device according to claim 8,
wherein the electronic device is configured as an integrated circuit, and
wherein the contact-less communication circuit domain and the secure element circuit domain are integrated into said integrated circuit.

12. The electronic device of claim 8, further comprising a mobile device, wherein the mobile device is a smart card or a mobile phone.

13. The electronic device of claim 8 wherein the external device is configured to provide the RF field and to detect the contact-less communication circuit domain of the electronic device, when said contact-less communication circuit domain is not in the mute status.

14. The electronic device of claim 13, wherein the external device is configured as one of the group consisting of a contact-less reader, a point of sale, a trusted service manager, or a transaction terminal.

* * * * *